United States Patent [19]

Nelson

[11] 4,029,848
[45] June 14, 1977

[54] UNSATURATED POLYESTER RESINS CONTAINING A DICYCLOPENTADIENE CONCENTRATE

[75] Inventor: Donald L. Nelson, Lake Jackson, Tex.

[73] Assignee: The Dow Chemical Company, Midland, Mich.

[22] Filed: Jan. 21, 1976

[21] Appl. No.: 651,325

[52] U.S. Cl. .............................. 428/430; 260/22 R; 260/26; 260/42; 260/75 A; 260/861; 260/871; 428/431
[51] Int. Cl.² ................. B32B 27/36; B32B 17/04; B32B 17/10; C08C 13/41
[58] Field of Search .......... 260/861, 871, 26, 22 R, 260/40 R, 75 A, 42; 428/430, 431, 388

[56] References Cited

UNITED STATES PATENTS

| | | | |
|---|---|---|---|
| 2,671,070 | 3/1954 | Knapp | 260/75 A |
| 2,830,925 | 4/1958 | Fennebresque | 428/431 X |
| 2,944,994 | 7/1960 | Singleton et al. | 260/861 X |
| 2,957,843 | 10/1960 | Anderson et al. | 260/861 X |
| 3,236,916 | 2/1966 | Wulff et al. | 260/861 X |
| 3,257,266 | 6/1966 | Sapper | 428/430 X |
| 3,347,806 | 10/1967 | Zimmermann | 260/861 X |
| 3,448,066 | 6/1969 | Parker | 260/22 R |
| 3,883,612 | 5/1975 | Pratt | 260/871 X |
| 3,933,757 | 1/1976 | Pratt | 260/871 X |
| 3,986,992 | 10/1976 | Canning et al. | 260/861 X |

Primary Examiner—Harold Ansher
Attorney, Agent, or Firm—Benjamin G. Colley

[57] ABSTRACT

Unsaturated polyester resins are produced which are modified with a low cost dicyclopentadiene concentrate. They are equal to or superior to the known resins containing a high purity dicyclopentadiene concentrate.

6 Claims, No Drawings

UNSATURATED POLYESTER RESINS CONTAINING A DICYCLOPENTADIENE CONCENTRATE

BACKGROUND OF THE INVENTION

This invention relates to unsaturated polyester resins containing a small but effective amount of a dicyclopentadiene concentrate and laminates prepared from them. More specifically, the invention relates to polyester resins produced by reacting a glycol, an olefinically unsaturated dicarboxylic acid or anhydride, a saturated dicarboxylic acid or anhydride and an effective amount of a dicyclopentadiene concentrate having as the main reactive components about 60 to about 90 percent by weight dicyclopentadiene, about 5 to about 30 percent by weight of the mixed Diels Alder dimers or adducts of diolefins such as butadiene, piperylene, isoprene, cyclopentadiene, and methyl cyclopentadiene.

It is well known from the report by P. L. Smith, et al. "The Use of Dicyclopentadiene in Polyesters", Proceedings of the 22nd Annual Technical Conference, S.P.I., Reinforced Plastics Division, Washington, D. C. (1967) and the article by R. Zimmerman, et al. "Modification of Unsaturated Polyesters with Dicyclopentadiene", Fette-Seifen-Anstrichmittel 66, No. 9, 670–678 (1964), and U.S. Pat. No. 3,347,806 that polyesters can be modified with a concentrated dicyclopentadiene extract.

SUMMARY OF THE INVENTION

It now has been found that dicyclopentadiene modified polyesters can be prepared using a less pure form of dicyclopentadiene and surprisingly, the polyesters thus prepared are equal to or better than those prepared with the highly concentrated dicyclopentadiene. A further advantage of this invention is that the economics are better in that the less pure form of dicyclopentadiene is substantially less in price.

The unsaturated polyester of this invention is thus prepared by reacting
A. a glycol,
B. an olefinically unsaturated dicarboxylic acid or its corresponding anhydride,
C. a saturated dicarboxylic acid or its corresponding anhydride, and
D. an effective amount of a dicyclopentadiene concentrate comprising about 60 to about 90 percent by weight of dicyclopentadiene and about 5 to about 30 percent by weight of the mixed Diels-Alder dimers of butadiene, piperylene, isoprene, cyclopentadiene and methyl cyclopentadiene.

A related aspect of this invention is the cross-linkable mixture of the above polyester resin with an olefinically unsaturated monomer such as styrene and a glass fiber laminate which has been impregnated and cured with the above mixture.

DESCRIPTION OF THE PREFERRED EMBODIMENTS

The glycols used to prepare the polyesters of this invention are those which are reactive with acids and/or anhydrides and may include, for example, ethylene glycol, propylene glycol, diethylene glycol, dipropylene glycol, butanediol, hexanediol, pentaerythritol, triethylene glycol, trimethylol propane, glycerol, or mixtures thereof. Preferably, the glycols used in this invention are ethylene glycol, propylene glycol, and/or dipropylene glycol and/or diethylene glycol as the major glycol component.

The unsaturated dicarboxylic acids or anhydrides that can be used include maleic, fumaric, mesaconic, itaconic, citraconic and the like or mixtures thereof.

Conventional saturated dibasic acids useful to prepare these polyesters include, for example, orthophthalic anhydride or acid, terephthalic acid, isophthalic acid, adipic acid, sebacic acid, succinic acid and the like acids or anhydrides.

The dicyclopentadiene concentrate used in this invention is a commercial product generally prepared by dimerizing a crude $C_5$ stream from the cracking of crude mixtures of hydrocarbons as set forth by Gebhart, et al. in U.S. Pat. No. 3,557,239.

These dicyclopentadiene concentrates have as the main reactive components about 60 to about 90 percent by weight of dicyclopentadiene, about 5 to about 30 percent by weight of the mixed Diels-Alder dimers of diolefins such as butadiene, cis and trans piperylene, isoprene, cyclopentadiene, and methyl cyclopentadiene. The remainder of these concentrates generally comprise benzene, cyclopentene, 1,5-hexadiene and oligomers of the above diolefins.

Examples of some of the dimers which have been identified in these concentrates are the Diels-Alder adducts of two moles of isoprene (isoprene dimers), the adduct of cyclopentadiene and isoprene, the adduct of cyclopentadiene and piperylene, and the like.

The polyesters are prepared by reacting about one mole each of the unsaturated acid or anhydride and the saturated acid or anhydride with about 2.0 to about 2.3 moles of the above glycols and with about 0.05 to about 0.3 moles of the dicyclopentadiene concentrate per mole of the unsaturated acid or anhydride.

The above components are charged to a reactor and heated to a temperature in the range of from about 120° to about 160° C and preferably from about 130° to about 150° C under reflux in a nitrogen atmosphere for a period of time ranging from about 1.0 to about 2 hours. Further exposure for an additional period up to 1 hour at 160° to 170° C may be practiced.

After this initial reaction or reflux, the reaction is heated to about 180° to about 220° C and preferably 190° to 205° C with a removal of the water of condensation by a Dean Stark trap until the acid number reaches about 30 to about 35.

The resin is then recovered and blended with an ethylenically unsaturated monomer copolymerizable with the unsaturated polyester polymers to form a blend wherein the weight ratio of polyester to monomer is in the range from about 4:1 to about 1:2. Such ethylenically unsaturated monomers are well known and include: styrene, methyl styrene, chlorostyrene, vinyl toluene, divinyl benzene, vinyl acetate, acrylic and methacrylic acid, lower alkyl esters of acrylic and methacrylic acid, diallyl phthalate and like unsaturated monomers or mixtures thereof.

These polyester blends with unsaturated monomers should contain about 20 to about 60 percent by weight and preferably 30–50 percent by weight of the monomers based on the weight of the polyester. A small amount of an inhibitor such as tertiary butyl catechol or the like may be added to this mixture.

The final blend is a crosslinkable polyester composition which is useful to make laminates.

The laminates are made by mixing in to the crosslinkable composition free radical forming catalysts and adding a suitable substrate such as fiberglass. Examples of these are benzoyl peroxide and methylethylketone peroxide and the like. It is also of value to add accelerators or promotors such as cobalt naphthenate, dimethyl aniline, and the like.

The polyester resin is rolled, sprayed or impregnated into a glass fabric and cured in a manner well known in the art.

The following examples are presented to illustrate but not limit the invention.

EXAMPLE 1

Into a resin flask equipped with a stirrer, nitrogen sparge, thermowell and cold condenser was charged 147 gms of maleic anhydride, 222 gms of phthalic anhydride, and 251.1 gms of propylene glycol. These reactants were heated to 90° C over a 15 minute period. 118 gms of an 83.9 percent dicyclopentadiene concentrate were added to the reactor over a 2 minute period. The reactants were then heated to 140° C. The time period was 2 hours from the point at which dicyclopentadiene (DCPD) concentrate addition was complete.

The controller was set at 170° C for a 1 hour period of time after which time the reflux condenser was replaced with a steam condenser and a Dean Stark Trap. The reaction mass was heated to 200° C using a nitrogen sparge.

After a total reaction time of 8.0 hours an acid number of 32 resulted and the heat cycle was terminated. At about 150° C, 100 ppm hydroquinone (based on 40 percent styrene) was added to the polyester.

At about 100° C 40 percent styrene containing 12 ppm tertiary butyl catechol was added to the resin. Agitation to effect proper blending was required.

A glass laminate containing 25 percent glass and 75 percent resin, was prepared using the above polyester with 0.6 percent Lupersol DDM (methylethyl ketone peroxide), 0.03 percent cobalt naphthenate 6 percent, and 0.005 percent dimethyl aniline. This system exhibited a gel time of 21 minutes and 46 seconds.

EXAMPLE 2

In a manner described in Example 1, a reactor was charged with a like amount of maleic anhydride, phthalic anhydride and propylene glycol. The heat cycle under reflux was the same. The major difference being the use of 114.3 gms of an 86.6 percent dicyclopentadiene concentrate. After a total of 3 hours under reflux, a steam condenser and Dean Stark trap were employed as above. The reactants were heated to 200° C.

After a total reaction time of 120 hours an acid number of 32 was attained. The polyester was blended with styrene in the manner described above.

A glass laminate containing 25 percent glass and 75 percent resin was prepared using 0.7 percent Lupersol DDM, 0.04 percent cobalt naphthenate 6 percent, 0.01 percent dimethyl aniline based on the total resin. This system had a gel time of 29 minutes and 52 seconds.

EXAMPLE 3

To the resin flask equipped as above were charged a like amount of maleic anhydride, phthalic anhydride and propylene glycol. After heating to 90° C, 133.5 gms of 74.16 percent dicyclopentadiene concentrate were added over a 2 minute period. The same heat cycles and subsequent use of a steam condenser and Dean Stark trap as described above were employed. An esterification temperature of 200° C was used.

After 7.5 hours an acid number of 27 was attained. The reaction was terminated. The polyester was blended with styrene in a manner identical to Example 1.

A glass laminate containing 25 percent glass was prepared in the manner described above. The catalyst system was 0.7 percent Lupersol DDM, 0.06 percent cobalt naphthenate 6 percent and 0.02 percent dimethyl aniline. The gel time of this system was 26 minutes and 41 seconds.

CONTROL NO. 1

Control No. 1 represents average values of 2 separate general purpose resins both of which were made in a resin flask equipped as described for the polyesterification stage in the above examples.

Both systems were made using 0.5 moles of maleic anhydride, 0.5 moles phthalic anhydride and 1.1 moles of propylene glycol.

Maximum esterification temperatures were in the range of 192°–197° C.

Glass laminates were made from each system and evaluated separately. For example, in one case 25 percent glass laminates were prepared using a resin with a room temperature gel time of 27 minutes. The catalyst system used was 0.4 percent Lupersol DDM, 0.02 percent cobalt naphthenate 6 percent and 0.02 percent dimethyl aniline.

CONTROL 2

In a manner described in Examples 1, 2 and 3, a reactor was charged with a like amount of maleic anhydride, phthalic anhydride and propylene glycol. The reactants were heated to 90° C at which point 103 gms of 96.1 percent pure dicyclopentadiene were added under reflux over a 4 minute period. A heat and dwell cycle identical to Examples 1, 2 and 3 was adhered to. After 9 hours from start up an acid number of 33 was attained.

As above, 100 ppm hydroquinone and 40 percent styrene were added to the resin.

The catalyst system used to prepare a laminate containing 25 percent glass was: 0.7 percent Lupersol DDM, 0.06 percent cobalt naphthenate and 0.02 percent dimethyl aniline. This system gelled in 22 minutes and 55 seconds at 24° C.

The following Tables I–III summarize the results obtained in the foregoing controls and examples.

TABLE I

| | EVALUATION OF DIFFERENT DCPD CONCENTRATES | | | | | |
| | A. Reaction Conditions | | | | | |
| Example | hrs. at 140° C | hrs at 170° C | Acid Number | Total Reaction Time | % HC in Distillate[1] | HC Reactive Efficiency[2] |
|---|---|---|---|---|---|---|
| Example 1 | 2 | 1 | 32 | 8.0 hrs | 11.8% | 93.5% |
| Example 2 | 2 | 1 | 32 | 12.0 hrs | 10.5% | 90.4% |
| Example 3 | 2 | 1 | 27 | 7.5 hrs | 16.1% | 87.0% |

TABLE I-continued

EVALUATION OF DIFFERENT DCPD CONCENTRATES

A. Reaction Conditions

| Example | hrs. at 140° C | hrs at 170° C | Acid Number | Total Reaction Time | % HC in Distillate[1] | HC Reactive Efficiency[2] |
|---|---|---|---|---|---|---|
| Control 1 | — | — | 34 | 14.0 hrs | — | — |
| Control 2 | 2 | 1 | 33 | 9.0 hrs | 12.7% | 88.7% |

[1] reactive hydrocarbons in distillate
[2] percent reactive hydrocarbons which are reacted

TABLE II

EVALUATION OF DIFFERENT DCPD CONCENTRATES

B. Polyester Properties

| Example | 24° C Viscosity 40% Styrene | Gardner Color | 180° F SPI[1] Gel Time (min.) | 180° F SPI[1] Cure Time (min.) | Max. Exotherm | Room Temp. Cure[2] Gel Time (min.) | Room Temp. Cure[2] Time to Max. Temp. (min.) | Room Temp. Cure[2] Max. Temp. |
|---|---|---|---|---|---|---|---|---|
| Example 1 | 84 cps | 1 | 5.7 | 11.2 | 309° F | 6.5 | 15.6 | 244° F |
| Example 2 | 110 cps | 3 | 4.3 | 9.1 | 318° F | 6.5 | 29.1 | 248° F |
| Example 3 | 87 cps | 1 | 4.5 | 12.5 | 284° F | 10.0 | 30.4 | 149° F |
| Control 1 | 203 cps | 1 | 4.3 | 6.3 | 400° F | 3.7 | 5.8 | 334° F |
| Control 2 | 82 cps | 3 | 4.5 | 10.4 | 317° F | 9.1 | 27.7 | 208° F |

[1] Uses 1% benzoyl peroxide
[2] Uses 1% MEK peroxide, 0.1% cobalt naphthenate 6%, 0.1% dimethyl aniline

TABLE III

EVALUATION OF DIFFERENT DCPD CONCENTRATES

C. Glass Laminate Properties

| Example | Flex Strength[1] psi × $10^3$ | Flex Modulus[1] psi × $10^3$ | Tensile Strength[2] psi × $10^3$ | Tensile Modulus[2] psi × $10^3$ | Percent Elongation[2] | Barcol Hardness |
|---|---|---|---|---|---|---|
| Example 1 | 24.5 | 846.5 | 11.7 | 1044.4 | 1.5 | 47 |
| Example 2 | 23.7 | 999.4 | 12.3 | 695.2 | 2.1 | 43 |
| Example 3 | 24.4 | 909.2 | 11.1 | 786.0 | 1.7 | 42 |
| Control 1 | 19.2 | 611.7 | 13.08 | 669.6 | 2.2 | 42 |
| Control 2 | 22.4 | 810.4 | 9.6 | 773.7 | 1.5 | 42 |

[1] ASTM D-790-61
[2] ASTM D-638-58T

I claim:

1. The unsaturated polyester produced by reacting:
   A. a glycol,
   B. an olefinically unsaturated dicarboxylic acid or its corresponding anhydride,
   C. a saturated dicarboxylic acid or its corresponding anhydride, and
   D. an effective amount of a dicyclopentadiene concentrate comprising about 60 to about 90 percent by weight of dicyclopentadiene and about 5 to about 30 percent by weight of the mixed Diels Alder dimers of butadiene, piperylene, isoprene, cyclopentadiene and methyl cyclopentadiene.

2. The polyester as set forth in claim 1 wherein
   A. is propylene glycol,
   B. is maleic anhydride and
   C. is phthalic anhyride.

3. The unsaturated polyester resin of claim 1 blended with a liquid ethylenically unsaturated monomer.

4. The unsaturated polyester of claim 3 wherein the weight ratio of polyester to monomer is in the range from about 4:1 to about 1:2.

5. A glass fiber laminate with the blend of claim 3.

6. A glass fiber laminate with the blend of claim 4.

* * * * *